US012191569B2

(12) United States Patent
Igarashi et al.

(10) Patent No.: US 12,191,569 B2
(45) Date of Patent: Jan. 7, 2025

(54) WAVE CONTROL MEDIUM, WAVE CONTROL ELEMENT, WAVE CONTROL DEVICE, AND METHOD FOR MANUFACTURING WAVE CONTROL MEDIUM

(71) Applicant: Sony Group Corporation, Tokyo (JP)

(72) Inventors: Eri Igarashi, Tokyo (JP); Nobuhiko Umezu, Tokyo (JP); Atsushi Yamada, Tokyo (JP); Mari Ichimura, Tokyo (JP)

(73) Assignee: Sony Group Corporation, Tokyo (JP)

( * ) Notice: Subject to any disclaimer, the term of this patent is extended or adjusted under 35 U.S.C. 154(b) by 84 days.

(21) Appl. No.: 17/922,141

(22) PCT Filed: Apr. 14, 2021

(86) PCT No.: PCT/JP2021/015403
§ 371 (c)(1),
(2) Date: Oct. 28, 2022

(87) PCT Pub. No.: WO2021/220808
PCT Pub. Date: Nov. 4, 2021

(65) Prior Publication Data
US 2023/0216206 A1 Jul. 6, 2023

(30) Foreign Application Priority Data
May 1, 2020 (JP) ................................ 2020-081510

(51) Int. Cl.
*H01Q 15/00* (2006.01)
*H01Q 17/00* (2006.01)
*H01P 7/00* (2006.01)

(52) U.S. Cl.
CPC ....... *H01Q 15/0086* (2013.01); *H01Q 17/002* (2013.01); *H01P 7/005* (2013.01)

(58) Field of Classification Search
CPC ............ H01Q 15/0086; H01Q 17/002; H01Q 17/00; H01P 7/005; H01P 7/10; H01P 1/2005
See application file for complete search history.

(56) References Cited

U.S. PATENT DOCUMENTS 11,476,555 B1 * 10/2022 Roper ...................... G02F 1/19
2005/0008308 A1 * 1/2005 Bita ...................... B82Y 20/00 385/123

(Continued)

FOREIGN PATENT DOCUMENTS

CN 105137520 A 12/2015
CN 107479215 A 12/2017

(Continued)

OTHER PUBLICATIONS

International Search Report from corresponding PCT application PCT/JP2021/015403, dated Jul. 6, 2021.

(Continued)

*Primary Examiner* — Seokjin Kim
(74) *Attorney, Agent, or Firm* — K&L Gates LLP

(57) ABSTRACT

Provided is a wave control medium capable of controlling waves while decreasing the size of a metamaterial or the like and increasing the bandwidth of the metamaterial or the like. A wave control medium 10 is formed by combining at least two among a coil 11 and a coil 12 which are three-dimensional microstructures formed into a spiral structure, the coil 11 and the coil 12 including any one of a metal, a dielectric material, a magnetic material, a semiconductor, and a superconductor, or a material selected from a plurality of combinations of these materials, and having functions of a capacitor and an inductor. The coil 11 and the coil 12 form a capacitor between the lateral face of the coil 11 and the lateral face of the coil 12 facing each other, and form an (Continued)

inductor by forming a three-dimensional multiple resonance structure by the coil 11 and the coil 12 having a spiral structure.

15 Claims, 16 Drawing Sheets

(56) References Cited

U.S. PATENT DOCUMENTS

| | | | | |
|---|---|---|---|---|
| 2008/0105826 | A1* | 5/2008 | Mercure | H01Q 15/0086 343/895 |
| 2009/0040131 | A1* | 2/2009 | Mosallaei | H01Q 15/0086 427/180 |
| 2009/0160718 | A1* | 6/2009 | Yen | H01Q 15/0086 343/742 |
| 2011/0139488 | A1* | 6/2011 | Toujo | H01P 3/081 428/222 |
| 2011/0170267 | A1* | 7/2011 | Ando | H01Q 15/14 174/126.1 |
| 2012/0212395 | A1* | 8/2012 | Sanada | H01Q 15/10 343/912 |
| 2013/0210679 | A1 | 8/2013 | Joseph et al. | |
| 2014/0043124 | A1* | 2/2014 | Liu | H01Q 15/08 335/296 |
| 2014/0111365 | A1* | 4/2014 | Liu | H05K 9/0081 342/4 |
| 2015/0362625 | A1* | 12/2015 | Hyde | G02B 1/005 359/578 |
| 2022/0021123 | A1* | 1/2022 | Koul | H01Q 17/007 |

FOREIGN PATENT DOCUMENTS

| | | | | |
|---|---|---|---|---|
| CN | 108493618 | A * | 9/2018 | |
| CN | 108767492 | A * | 11/2018 | G02B 1/002 |
| CN | 110416740 | A | 11/2019 | |
| JP | 2016051911 | A | 4/2016 | |
| JP | 2017152959 | A | 8/2017 | |
| WO | 2005003830 | A2 | 1/2005 | |
| WO | 2006078658 | A1 | 7/2006 | |
| WO | 2010026907 | A1 | 3/2010 | |
| WO | 2016031459 | A1 | 3/2016 | |

OTHER PUBLICATIONS

J. B. Pendry; A. J. Holden; D. J. Robbins; W. J. Stewart; Magnetism From Conductors and Enhanced Nonlinear Phenomena; IEEE Transactions on Microwave Theory and Techniques; vol. 47; No. 11; 1999; pp. 2075-2084.

Zhenyu Yang; Zeqin Lu; Lin Wu; Peng Zhang; Ming Zhao; A Novel Helical Metamaterial Absorber:Simulation Study With the FDTD Method; 2012 International Workshop on Metamaterials; METAJ; IEEE; 2013; II. Simulation Models and Results; Fig. 1.

* cited by examiner

A

B

WAVE CONTROL MEDIUM, WAVE CONTROL ELEMENT, WAVE CONTROL DEVICE, AND METHOD FOR MANUFACTURING WAVE CONTROL MEDIUM

TECHNICAL FIELD

The present technology relates to a technique using a wave control medium or the like, and more specifically, to a technique of controlling a wave using an artificial structure.

BACKGROUND ART

Conventionally, it has been proposed to use a metamaterial having characteristics such as a negative refractive index for reflection, shielding, absorption, phase modulation, and the like of various waves including radio waves, light waves, and sound waves. Here, the metamaterial refers to an artificial structure that generates a function that cannot be exhibited by naturally occurring materials. The metamaterial is designed to exhibit a property that does not occur naturally by arranging unit microstructures such as metals, dielectric materials, magnetic materials, semiconductors, or superconductors at intervals that are sufficiently smaller than wavelengths. The metamaterial thus produced can control a wave such as an electromagnetic wave by controlling the permittivity and the magnetic permeability.

A wave control medium which is a unit structure of the metamaterial commonly has a size about 1/10 of wavelengths, and exhibits functions by being formed into an array structure in which about several unit structures are arrayed. When handling a wave having a long wavelength such as a microwave or a sound wave in a visible and audible range, the structure of the metamaterial is also enlarged according to the wavelength, and needs a large footprint. This is a problem when such a wave is handled by a small electronic device.

In addition, since the operation principle of the metamaterial is based on a resonance phenomenon due to an interaction between a wave and a structure, the response intensity of the metamaterial rapidly decreases at frequencies other than the resonance frequency, and the metamaterial provides only a narrowband response. This is a problem in a case where a broadband frequency is handled simultaneously.

Therefore, in view of the above problems, it is desired to simultaneously achieve a reduction in size and an increase in bandwidth of the metamaterial in order to achieve the practical use of the metamaterial.

As a solution for a reduction in size, Patent Document 1, for example, proposes a metamaterial including: a plurality of first resonators, each of which generates a negative permittivity with respect to a predetermined wavelength and has an internal space; a plurality of second resonators, each of which generates a negative magnetic permeability with respect to the predetermined wavelength; and a supporting member for fixing the positions of the first resonators and the second resonators, in which the supporting member fixes each of the second resonators inside the plurality of first resonators, and fixes the plurality of first resonators so that the plurality of first resonators are located in a spatially continuous manner.

In addition, as a solution for an increase in bandwidth, Patent Document 2, for example, proposes a metamaterial device including a lattice structure including a strip dielectric instead of a lattice structure including a strip conductor.

CITATION LIST

Patent Document

Patent Document 1: International Publication No. 2010/026907

Patent Document 2: Japanese Patent Application Laid-Open No. 2017-152959

SUMMARY OF THE INVENTION

Problems to be Solved by the Invention

However, the technologies described in Patent Document 1 and Patent Document 2 do not propose a solution for simultaneously satisfying a reduction in size and an increase in bandwidth of the metamaterial, and thus, further development of a wave control medium that is a unit structure of the metamaterial simultaneously satisfying these requirements is desired.

In view of this, a main object of the present technology is to provide a wave control medium capable of controlling a wave while reducing the size of a metamaterial or the like and increasing the bandwidth of the metamaterial or the like.

Solutions to Problems

The present technology provides a wave control medium comprising at least two three-dimensional microstructures in combination, each of the three-dimensional microstructures including any one of a metal, a dielectric material, a magnetic material, a semiconductor, and a superconductor, or a material selected from a plurality of combinations of a metal, a dielectric material, a magnetic material, a semiconductor, and a superconductor, the wave control medium having functions of a capacitor and an inductor.

In addition, each of the three-dimensional microstructures may be formed into a spiral structure. Each of the three-dimensional microstructures may be formed into a multilayer structure. The at least two three-dimensional microstructures may be formed into a continuous structure in which the at least two three-dimensional microstructures are entangled with each other while facing each other without being in contact with each other. Each of the three-dimensional microstructures may be formed into a conical shape. At least one of the three-dimensional microstructures may be formed into any one of a wire shape, a plate shape, and a spherical shape.

In addition, the present technology provides a wave control element in which the wave control medium is integrated in an array structure, or a plurality of the wave control mediums is dispersed. The present technology can also provide a wave control element comprising the wave control medium, in which a distance in a longitudinal direction is less than 1/10 of a wavelength of a wave, and a fractional bandwidth of a response is 30% or more.

In addition, the present technology provides a wave control device including a metamaterial that includes the wave control medium. The present technology also provides a wave control device comprising an electromagnetic wave absorbing and/or shielding member having the metamaterial. In addition, the present technology provides a wave control device comprising a sensor including the electromagnetic wave absorbing and/or shielding member.

In addition, the present technology provides a wave control device including an electromagnetic waveguide that includes the wave control medium. In addition, the present technology provides a wave control device including an arithmetic element that includes the electromagnetic waveguide. In addition, the present technology provides a wave control device that performs transmission/reception or light reception/emission using the wave control medium.

In addition, the present technology provides a method for manufacturing a wave control medium, the method comprising forming a microstructure into a three-dimensional structure using a molecular template that uses self-assembly of an organic substance, the microstructure including any one of a metal, a dielectric material, a magnetic material, a semiconductor, and a superconductor, or a material selected from a plurality of combinations of a metal, a dielectric material, a magnetic material, a semiconductor, and a superconductor.

Effects of the Invention

The present technology can provide a wave control medium capable of controlling a wave while reducing the size of a metamaterial or the like and increasing the bandwidth of the metamaterial or the like. It should be noted that the above effects are not necessarily restrictive, and any of the effects described in the present specification or other effects that can be grasped from the present specification may be provided together with or in place of the above effects.

MODE FOR CARRYING OUT THE INVENTION

Figure 1:
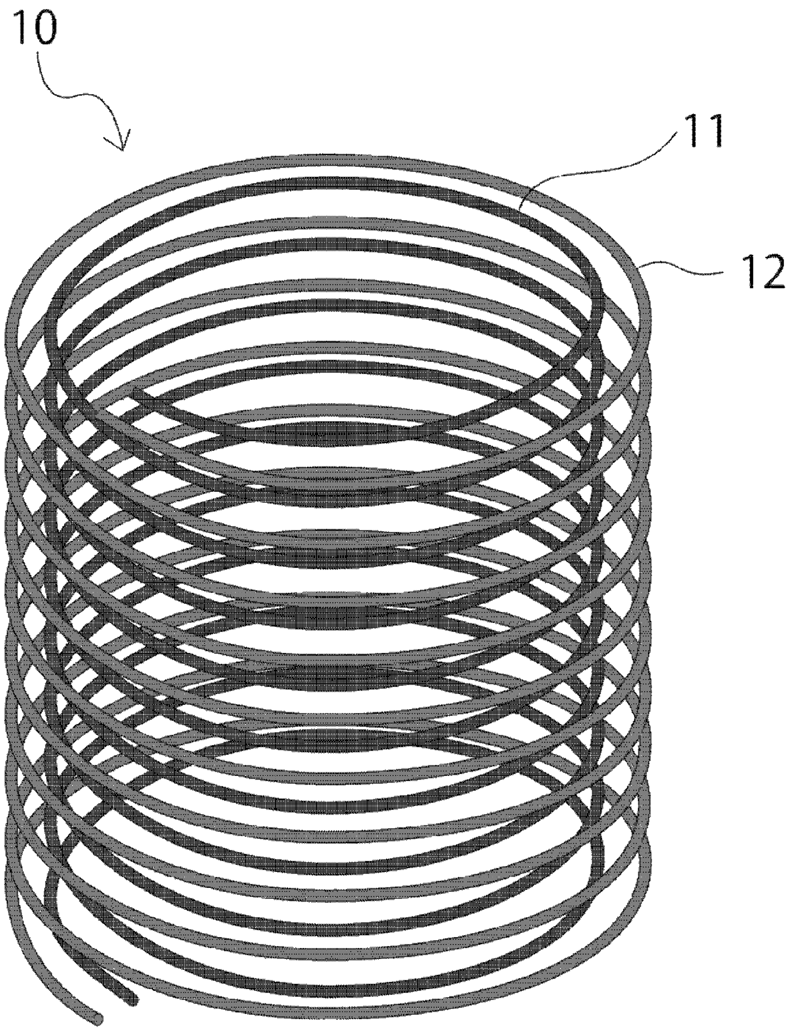
FIG. 1 is a perspective view illustrating a configuration example of a three-dimensional microstructure of a wave control medium according to a first embodiment of the present technology.

Preferred modes for carrying out the present technology will be described below with reference to the drawings. The embodiments described below show an example of a representative embodiment of the present technology, and any embodiments can be combined. In addition, the scope of the present technology is not narrowly construed by the embodiments. Note that the description will be given in the following order.

1. First embodiment (multi-coil type)
(1) Overview of metamaterial
(2) Configuration example of wave control medium 10 (multi-coil type 1)
(3) Example of method for manufacturing wave control medium 10
(4) Modification (multi-coil type 2)
2. Second embodiment (coaxial cable type)
3. Third embodiment (double gyroid type)
4. Fourth embodiment (conical type)
5. Fifth embodiment (combination with wire structure)
(1) Combination of a plurality of structures
(2) Configuration example of wave control medium 50
(3) First modification of wave control medium 50
(4) Second modification of wave control medium 50
6. Sixth embodiment (combination with plate structure)
(1) Configuration example of wave control medium 80
(2) Modification of wave control medium 80
7. Seventh embodiment (combination with spherical structure)
8. Eighth embodiment (electromagnetic wave absorbing member)
9. Ninth embodiment (electromagnetic waveguide)
(1) Configuration example of electromagnetic waveguide 120
(2) Modification of electromagnetic waveguide 120
10. Fractional bandwidth
11. Other Applications 1. First Embodiment (Multi-Coil Type)

(1) Overview of Metamaterial

First, an overview of a metamaterial having a wave control medium which is a unit structure of a medium for controlling a wave such as an electromagnetic wave or a sound wave will be described.

The metamaterial is configured, for example, by arranging, in a dielectric material, unit structures each of which has a size sufficiently smaller than a wavelength of an electromagnetic wave and has a resonator inside. Note that the interval between the unit structures (resonators) of the metamaterial is set to about 1/10 or less, or about 1/5 or less of the wavelength of the electromagnetic wave to be used.

Due to the configuration described above, the permittivity ε and/or the magnetic permeability μ of the metamaterial can be artificially controlled, and the refractive index n ($=\pm[\varepsilon\cdot\mu]^{1/2}$) of the metamaterial can be artificially controlled. In particular, the metamaterial can be set to exhibit a negative refractive index with respect to an electromagnetic wave having a desired wavelength by appropriately adjusting, for example, the shape, dimension, and the like of the unit structure to thereby achieve a negative permittivity and a negative magnetic permeability simultaneously.

Meanwhile, the resonance (operation) frequency ω of the metamaterial is determined by an inductance L and a capacitance C in a case where the metamaterial is described as a circuit according to the LC circuit theory, and the larger the inductance L and the capacitance C, the lower the resonance frequency. That is, when having a high-density structure with a large inductance L and capacitance C, the metamaterial can function for a wave having a long wavelength (=a low frequency), although it is small.

In view of this, in order to achieve the practical use of the metamaterial described above, the present embodiment will describe an example of a configuration of a wave control medium which is a unit structure of the metamaterial capable of simultaneously achieving a reduction in size and an increase in bandwidth of the metamaterial, and a method for manufacturing the wave control medium.

(2) Configuration Example of Wave Control Medium 10 (Multi-Coil Type 1)

First, a configuration example (multi-coil type 1) of a three-dimensional microstructure of a wave control medium 10 according to the first embodiment of the present technology will be described with reference to FIG. 1. FIG. 1 is a perspective view illustrating the configuration example of the three-dimensional microstructure of the wave control medium 10 of the multi-coil type 1 according to the present embodiment. The wave control medium 10 according to the present embodiment is a unit structure of a metamaterial, and can control a wave such as an electromagnetic wave or a sound wave.

As illustrated in FIG. 1, the wave control medium 10 includes a coil 11 and a coil 12 each of which is a three-dimensional microstructure formed in a spiral structure. The wave control medium 10 has a thin-wire double-spiral structure in which the coil 12 is wound in parallel with and outside the coil 11 so as to face the coil 11. The wave control medium 10 is not limited to have a double coil structure, and may have a multi-coil structure having three or more coils. In a case where the multi-coil structure having three or more coils is applied, the coils are not limited to face each other in parallel with each other, and they may be located at any position as long as they are not directly in contact with each other.

The coil 11 and the coil 12 are formed using a thin copper wire or the like including any one of a metal, a dielectric material, a magnetic material, a semiconductor, and a superconductor, or a material selected from a plurality of combinations of these materials. The materials of the coil 11 and the coil 12 are not necessarily the same, and may be different from each other. In addition, the coil 11 and the coil 12 form a capacitor between a lateral face of the coil 11 and a lateral face of the coil 12 facing each other, and form an inductor by forming a three-dimensional multiple resonance structure by the coil 11 and the coil 12 having a spiral structure.

Figure 2:
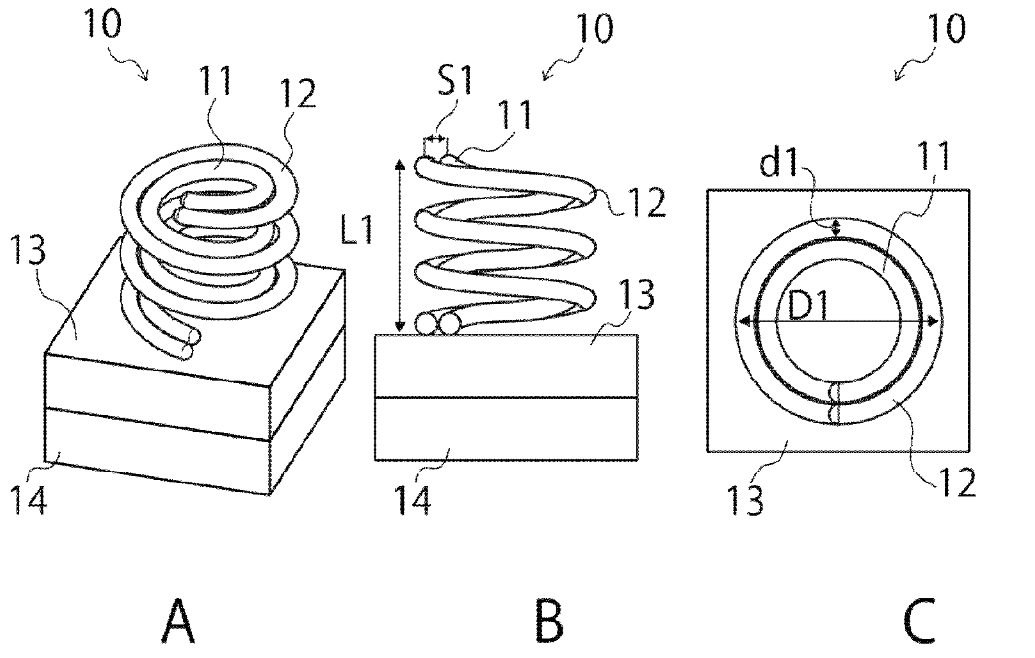
FIG. 2 is a perspective view illustrating a configuration example of the wave control medium according to the first embodiment of the present technology.

Next, a configuration example of the wave control medium 10 according to the present embodiment will be described with reference to FIG. 2. FIG. 2A is a perspective view illustrating the configuration example of the wave control medium 10 of a multi-coil type 1 according to the present embodiment. FIG. 2B is a side view illustrating the configuration example of the wave control medium 10, and FIG. 2C is a plan view illustrating the configuration example of the wave control medium 10.

As illustrated in FIG. 2A, the wave control medium 10 includes the coil 11 and the coil 12 formed in a double spiral structure wound in parallel, and a base section 14 formed as a substrate or a rectangular parallelepiped and connected to the coil 11 and the coil 12 via a matching element 13. The matching element 13 is disposed on the entire surface of the base section 14 facing the coil 11 and the coil 12.

Examples of an element usable for the matching element 13 includes a copper plate, a resin, a loss resistance element functioning as a register, and a circuit element functioning as a capacitor and an inductor. In addition, examples of a material usable for the base section 14 include a resin and a dielectric material.

As illustrated in FIG. 2B, an entire height L1 of the coil 11 and the coil 12 is preferably 1/100 to 1/2 of the wavelength of an incident wave, and a width S1 between the coil 11 and the coil 12 in the horizontal direction with respect to the surface of the base section 14 is preferably 1/1000 to 1/10 of the wavelength of the incident wave. The wave control medium 10 has a structure in which each of the coil 11 and the coil 12 has a function equivalent to a reactance and a function equivalent to a capacitor due to an interval of the width S1.

In addition, as illustrated in FIG. 2C, a diameter D1 of one turn of the coil 11 and the coil 12 is preferably 1/100 to 1/2 of the wavelength of the incident wave, and a width d1 of the thin wire of each of the coil 11 and the coil 12 is preferably 1/1000 to 1/100 of the wavelength of the incident wave.

The wave control medium 10 according to the present embodiment provides a solution for simultaneously achieving a reduction in size and an increase in bandwidth by applying a three-dimensional multi-coil structure including a plurality of facing conductive thin wires as a unit microstructure of the metamaterial.

It is known that a metamaterial having a three-dimensional coil structure resonates with a wave having a wavelength equivalent to a coil length of the metamaterial and a shorter wave having a wavelength equivalent to one over the constant thereof, and exhibits broadband characteristics in which a plurality of resonance peaks are broadly connected. In addition, the relationship between the size of the structure of the metamaterial and wavelengths depends on inductance and capacitance when the structure of the metamaterial is regarded as an equivalent circuit, and a metamaterial having a larger inductance and capacitance can be made smaller.

The wave control medium 10 has a multiplexed three-dimensional coil structure, thereby increasing inductance, and forms a capacitor between thin wires, thereby increasing capacitance. Therefore, according to the wave control medium 10, it is possible to achieve a metamaterial which can be downsized by a fine structure and which has broad-band characteristics by a three-dimensional multiple resonance structure. In addition, due to the matching element 13 included in the wave control medium 10, the wave control medium 10 can moderate a change in the entire impedance value and enables absorption of the reflected wave in the base section 14. Therefore, the wave control medium 10 can absorb and control waves.

In addition, according to the wave control medium 10, a wave control element (antenna, lens, speaker, etc.) using the wave control medium 10 can be greatly downsized. In addition, according to the wave control medium 10, perfect shielding, absorption, rectification, filtering, and the like which are new functions that cannot be achieved by natural materials is enabled. Furthermore, the wave control medium 10 can exhibit the above effects in a wide range of fields such as a light wave and a sound wave in addition to an electromagnetic wave. In particular, the wave control medium 10 can exert the effects in a region having a long wavelength and a wide band.

(3) Example of Method for Manufacturing Wave Control Medium 10

Next, an example of a method for manufacturing the wave control medium 10 according to the present embodiment will be described.

The wave control medium 10 can be manufactured by a molecular template method as an example. Here, the molecular template method refers to a method for forming a microstructure including any one of a metal, a dielectric material, a magnetic material, a semiconductor, a superconductor, and the like, or a material selected from a plurality of combinations of these materials, using a fine and complicated structure obtained from an organic substance (artificial/biopolymer, nanoparticle, liquid crystal molecule, etc.) as a template. As the molecular template method, two methods described below are mainly known.

The first method is a method for coating an organic structure with plating or the like. The second method is a method for forming a structure using an organic substance into which a precursor such as a metal or an oxide is introduced in advance, and converting the precursor into a metal, an oxide, or the like by performing firing, oxidation-reduction, or the like on the structure.

In the present embodiment, the wave control medium 10 formed as the coil 11 and the coil 12 having a metal spiral structure is manufactured by applying electrolysis or electroless plating to a three-dimensional spiral structure that is formed using an organic substance as a template. In the manufacturing process of the wave control medium 10, the coil 11 and the coil 12 can be formed in a three-dimensional fine structure by utilizing self-assembly of the organic substance. According to the manufacturing method of the present embodiment, it is possible to easily manufacture the wave control medium 10 having a complicated and fine three-dimensional microstructure that is difficult to manufacture by a common method.

Note that the wave control medium 10 may be manufactured by a method of forming a three-dimensional spiral structure using deflection of a metal pattern due to stress after a metal film formed on a substrate such as a dielectric material is etched.

(4) Modification (Multi-Coil Type 2)

Figure 3:
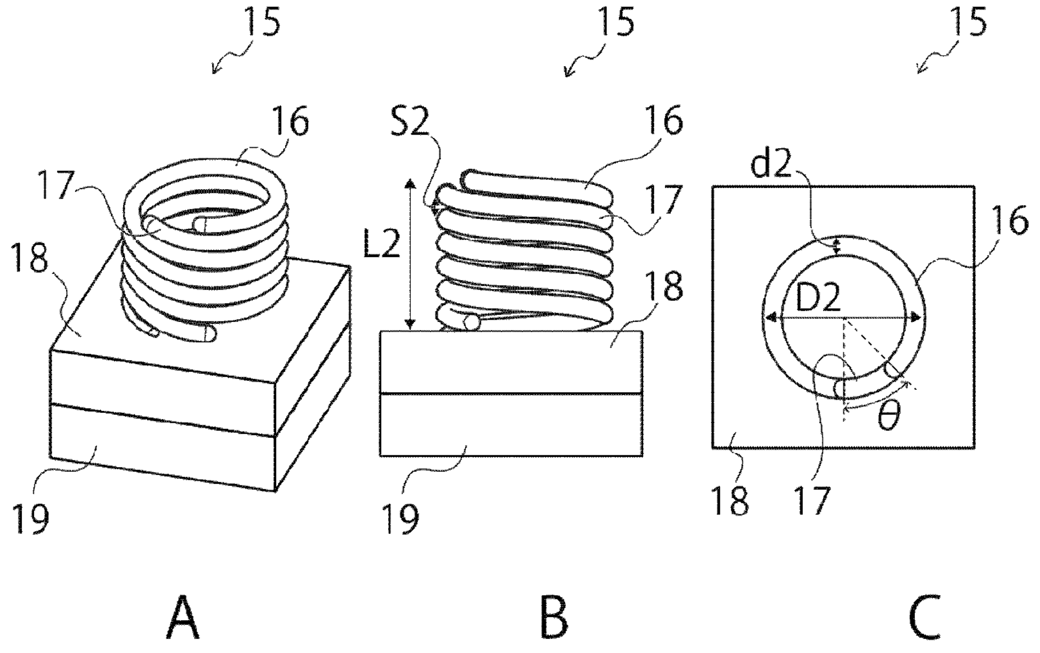
FIG. 3 is a perspective view illustrating a configuration example of a wave control medium according to a modification of the first embodiment of the present technology.

Next, a configuration example of a wave control medium 15 according to a modification of the present embodiment will be described with reference to FIG. 3. FIG. 3A is a perspective view illustrating the configuration example of the wave control medium 15 of a multi-coil type 2 according to the modification of the present embodiment. FIG. 3B is a side view illustrating the configuration example of the wave control medium 15, and FIG. 3C is a plan view illustrating the configuration example of the wave control medium 15. Similarly to the wave control medium 10 according to the present embodiment, the wave control medium 15 is a unit structure of a metamaterial.

As illustrated in FIG. 3A, the wave control medium 15 includes a coil 16 and a coil 17 formed in a double spiral structure in which the coils 16 and 17 vertically overlap with ends being displaced from each other, and a base section 19 formed as a substrate or a rectangular parallelepiped and connected to the coil 16 and the coil 17 via a matching element 18. The matching element 18 is disposed on the entire surface of the base section 19 facing the coil 16 and the coil 17.

As illustrated in FIG. 3B, an entire height L2 of the coil 16 and the coil 17 is preferably 1/100 to 1/2 of the wavelength of an incident wave, and a width S2 between the coil 16 and the coil 17 in the vertical direction with respect to the surface of the base section 19 is preferably 1/1000 to 1/10 of the wavelength of the incident wave. The wave control medium 15 has a structure in which each of the coil 16 and the coil 17 has a function equivalent to a reactance and a function equivalent to a capacitor due to an interval of the width S2.

In addition, as illustrated in FIG. 3C, a diameter D2 of one turn of the coil 16 and the coil 17 is preferably 1/100 to 1/2 of the wavelength of the incident wave, and a width d2 of the thin wire of each of the coil 16 and the coil 17 is preferably 1/1000 to 1/100 of the wavelength of the incident wave. Furthermore, the displacement between the end of the coil 16 and the end of the coil 17 in the spiral direction (circumferential direction) is preferably 1° to 90° in terms of the center angle θ of one turn.

The materials of the coil 16 and the coil 17 are not necessarily the same, and may be different from each other. In addition, the coil 16 and the coil 17 form a capacitor between the lower surface of the coil 16 and the upper surface of the coil 17 facing each other, and form an inductor by forming a three-dimensional multiple resonance structure by the spiral structure of the coil 17.

The wave control medium 15 has a multiplexed three-dimensional coil structure, thereby increasing inductance, and forms a capacitor between thin wires, thereby increasing capacitance. Therefore, according to the wave control medium 15, it is possible to achieve a metamaterial which can be downsized by a fine structure and which has broader band characteristics by a three-dimensional multiple resonance structure. In addition, similarly to the wave control medium 10, the wave control medium 15 can absorb and control the wave by the matching element 18.

2. Second Embodiment (Coaxial Cable Type)

Figure 4:
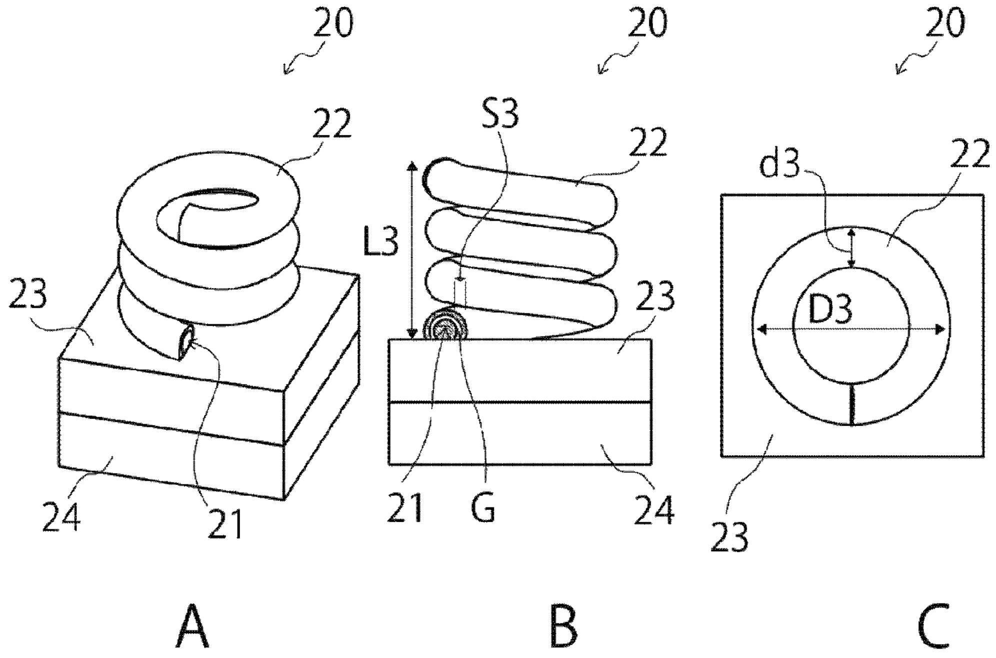
FIG. 4 is a perspective view illustrating a configuration example of a wave control medium according to a second embodiment of the present technology.
Figure 5:
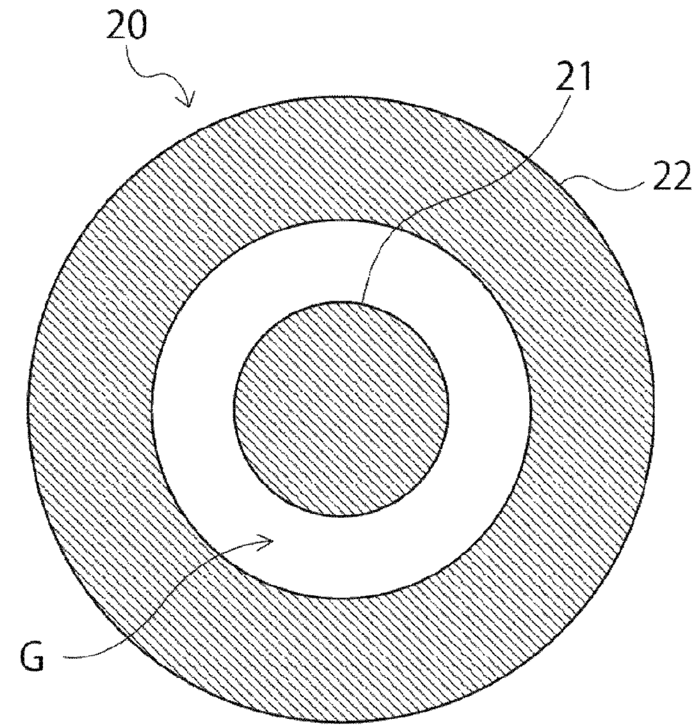
FIG. 5 is a cross-sectional view illustrating the configuration example of the wave control medium according to the second embodiment of the present technology.

Next, a configuration example of a wave control medium 20 according to the second embodiment of the present technology will be described with reference to FIGS. 4 and 5. FIG. 4A is a perspective view illustrating the configuration example of the wave control medium 20 of a coaxial cable type according to the present embodiment. FIG. 4B is a side view illustrating the configuration example of the wave control medium 20, and FIG. 4C is a plan view illustrating the configuration example of the wave control medium 20. FIG. 5 is a cross-sectional view illustrating a configuration example of a three-dimensional structure of the wave control medium 20. The wave control medium 20 according to the present embodiment is a unit structure of a metamaterial as in the first embodiment.

As illustrated in FIG. 4A, the wave control medium 20 includes a coil 22 formed in a spiral structure and a base section 24 formed as a substrate or a rectangular parallelepiped and connected to the coil 22 via a matching element 23. The coil 22 has an internal space in which a coil 21 is disposed with a gap or resin between the coil 21 and the coil 22. The matching element 23 is disposed on the entire surface of the base section 24 facing the coil 22.

As illustrated in FIG. 4B, an entire height L3 of the coil 22 is preferably 1/100 to 1/2 of the wavelength of an incident wave, and a width S3 of a gap G or a resin between the coil 21 and the coil 22 is preferably 1/1000 to 1/10 of the wavelength of the incident wave. The wave control medium 20 has a structure in which each of the coil 21 and the coil 22 has a function equivalent to a reactance and a function equivalent to a capacitor due to an interval of the width S3.

In addition, as illustrated in FIG. 4C, a diameter D3 of one turn of the coil 21 and the coil 22 is preferably 1/100 to 1/2 of the wavelength of the incident wave, and a width d3 of the thin wire of each of the coil 21 and the coil 22 is preferably 1/1000 to 1/100 of the wavelength of the incident wave.

As illustrated in FIG. 5, the three-dimensional structure of the wave control medium 20 is of a coaxial cable type. The wave control medium 20 is formed in, for example, a two-layer structure (multilayer structure) having a shape in which an outer surface of the coil 21, which is a three-dimensional microstructure formed in a spiral structure like the wave control medium 10 according to the first embodiment, is covered with an inner surface of the coil 22 with a fine gap G or resin interposed therebetween. The wave control medium 20 has one coil structure as a whole, but has two three-dimensional microstructures formed by the coil 22 and the coil 21 incorporated in the coil 22. Note that the wave control medium 20 is not limited to have a two-layer structure, and may have a multilayer structure of three or more layers. Further, the wave control medium 20 is not limited to have one coil structure as a whole, and may have a multi-coil structure having two or more coil structures.

The coil 21 and the coil 22 are constituted by thin wires. The coil 21 and the coil 22 form a capacitor between the outer surface of the coil 21 and the inner surface of the coil 22 facing each other, and form an inductor by forming a three-dimensional multiple resonance structure by the coil 21 and the coil 22 having a spiral structure.

The wave control medium 20 has a multiplexed three-dimensional coil structure, thereby increasing inductance, and forms a capacitor between the outer surface of the thin-wire coil 21 and the inner surface of the thin-wire coil 22, thereby increasing capacitance. Therefore, according to the wave control medium 20, it is possible to achieve a metamaterial which can be downsized by a fine structure and which has broadband characteristics by a three-dimensional multiple resonance structure, as in the first embodiment.

3. Third Embodiment (Double Gyroid Type)

Figure 6:
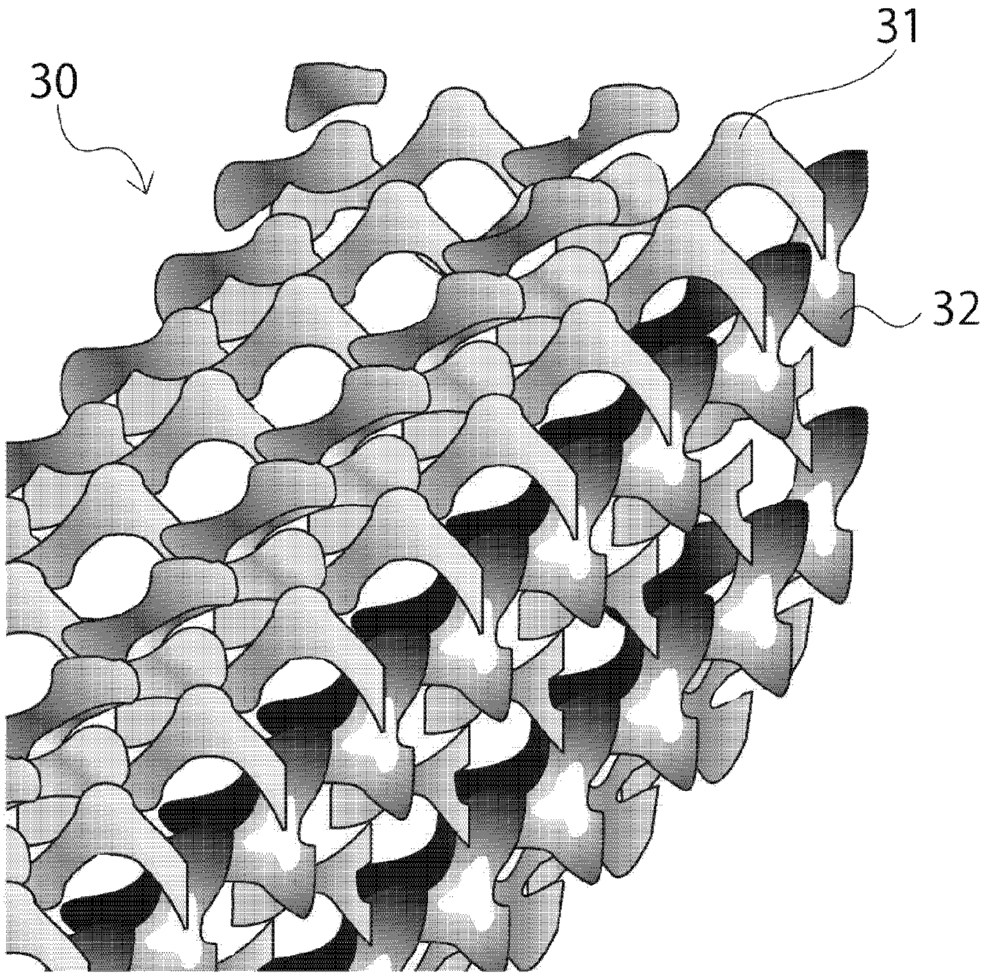
FIG. 6 is a perspective view illustrating a configuration example of a wave control medium according to a third embodiment of the present technology.

Next, a configuration example of a wave control medium 30 according to the third embodiment of the present technology will be described with reference to FIG. 6. FIG. 6 is a perspective view illustrating the configuration example of the wave control medium 30 of a double gyroid type according to the present embodiment. The wave control medium 30 according to the present embodiment is also a unit structure of a metamaterial as in the first embodiment.

As illustrated in FIG. 6, the wave control medium 30 is of a double gyroid type. Here, the double gyroid refers to a continuous structure in which two coils are entangled while facing each other without being in contact with each other. The wave control medium 30 includes a coil 31 and a coil 32 each of which is a three-dimensional microstructure, and has a continuous three-dimensional structure in which the coil 31 and the coil 32 are entangled while facing each other without being in contact with each other. Note that the wave control medium 30 is not limited to have a double gyroid with double coils, and may have a gyroid having a multi-coil structure having three or more coils.

The coil 31 and the coil 32 are constituted by thin wires. The coil 31 and the coil 32 form a capacitor between a lateral face of the coil 31 and a lateral face of the coil 22 facing each other, and form an inductor by forming a three-dimensional multiple resonance structure by the coil 31 and the coil 32 which define a continuous three-dimensional structure.

The wave control medium 30 has a multiplexed three-dimensional coil structure, thereby increasing inductance, and forms a capacitor between the lateral face of the thin-wire coil 31 and the lateral face of the thin-wire coil 22, thereby increasing capacitance. Therefore, according to the wave control medium 30, it is possible to achieve a metamaterial which can be downsized by a fine structure and which has broadband characteristics by a three-dimensional multiple resonance structure, as in the first embodiment.

4. Fourth Embodiment (Conical Type)

Figure 7:
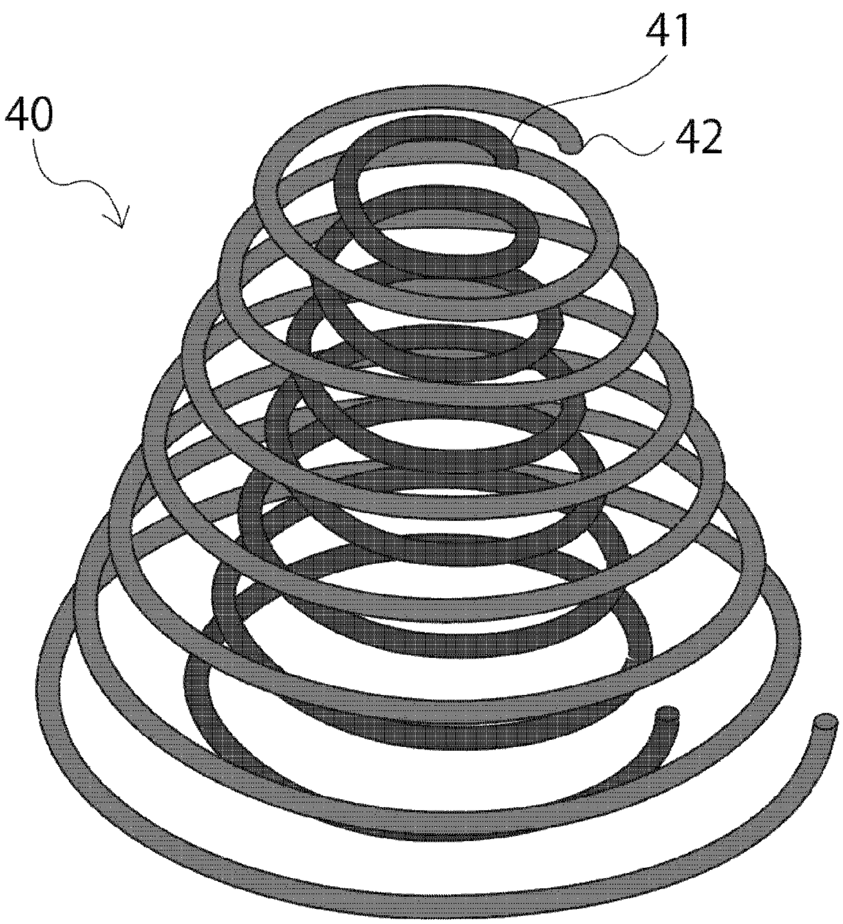
FIG. 7 is a perspective view illustrating a configuration example of a wave control medium according to a fourth embodiment of the present technology.

Next, a configuration example of a wave control medium 40 according to the fourth embodiment of the present technology will be described with reference to FIG. 7. FIG. 7 is a perspective view illustrating the configuration example of the wave control medium 40 of a conical type according to the present embodiment. The wave control medium 40 according to the present embodiment is also a unit structure of a metamaterial as in the first embodiment.

As illustrated in FIG. 7, the wave control medium 40 as a whole has a conical shape flaring downward with respect to the paper surface of FIG. 7. The wave control medium 40 includes a coil 41 and a coil 42 each of which is a three-dimensional microstructure, and has a thin-wire double spiral structure in which the coil 42 is wound in parallel with and outside the coil 41 so as to face the coil 42. Note that the wave control medium 40 is not limited to have a double coil structure, and may have a multi-coil structure having three or more coils. In addition, the wave control medium 40 may have a conical shape that narrows downward with respect to the paper surface of FIG. 7 as a whole.

The coil 41 and the coil 42 are constituted by thin wires. The coil 41 and the coil 42 form a capacitor between a lateral face of the coil 41 and a lateral face of the coil 42 facing each other, and form an inductor by forming a three-dimensional multiple resonance structure by the coil 41 and the coil 42 which have a conical spiral structure.

The wave control medium 40 has a multiplexed three-dimensional coil structure, thereby increasing inductance, and forms a capacitor between the lateral face of the thin-wire coil 41 and the lateral face of the thin-wire coil 42, thereby increasing capacitance. Therefore, according to the wave control medium 40, it is possible to achieve a metamaterial which can be downsized by a fine structure and which has broadband characteristics by a three-dimensional multiple resonance structure, as in the first embodiment.

5. Fifth Embodiment (Combination with Wire Structure)

(1) Combination of a Plurality of Structures

The fifth embodiment of the present technology will describe an example in which a wave control medium is designed using a combination of a plurality of structures. The plurality of structures is combined in order to obtain, for example, a structure in which each of the plurality of structures functions for an electric field and a magnetic field constituting an electromagnetic wave. That is, the plurality of structures is combined in order to distribute functions over each structure.

Here, functioning for the electric field means controlling the relative permittivity $\varepsilon_r$, and functioning for the magnetic field means controlling the relative magnetic permeability $\mu_r$. Therefore, the wave control medium according to the present embodiment can more freely control the relative permittivity and the relative magnetic permeability to desired values by combining a plurality of structures.

(2) Configuration Example of Wave Control Medium 50

Figure 8:
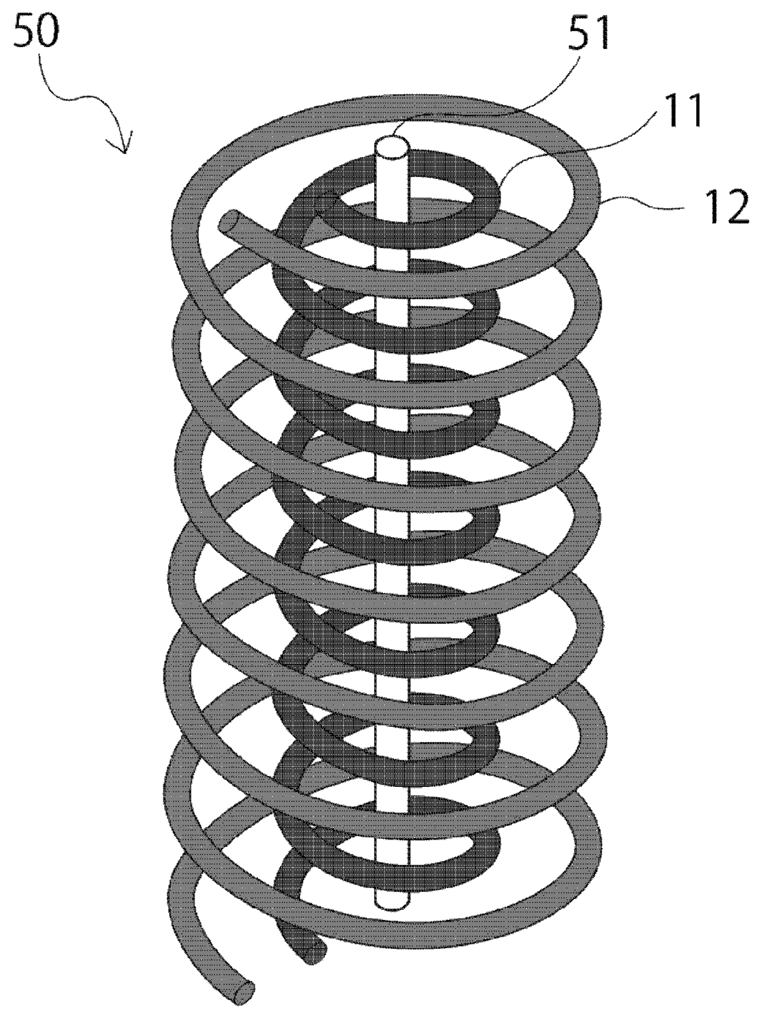
FIG. 8 is a perspective view illustrating a configuration example of a wave control medium according to a fifth embodiment of the present technology.

Next, a configuration example of a wave control medium 50 according to the fifth embodiment of the present technology will be described with reference to FIG. 8. FIG. 8 is a perspective view illustrating the configuration example of the wave control medium 50 according to the present embodiment. The wave control medium 50 is different from the wave control medium 10 according to the first embodiment in that a wire structure is combined with a double coil structure. The other configurations of the wave control medium 50 are similar to those of the wave control medium 10.

As illustrated in FIG. 8, the wave control medium 50 includes a coil 11 and a coil 12 each of which is a three-dimensional microstructure formed in a spiral structure. The wave control medium 50 has a thin-wire double spiral structure in which the coil 12 is wound in parallel with and outside the coil 11 so as to face the coil 12. Further, the wave control medium 50 is provided with a rod-shaped thin wire 51 extending in the direction in which the central axis extends at the central axis position of the spiral structure inside the coil 11. The wire 51 is disposed apart from the coil 11 at a fine interval.

The wave control medium 50 is not limited to have a double coil structure, and may have only one coil or a multi-coil structure having three or more coils. In a case where the multi-coil structure having three or more coils is applied, the coils are not limited to face each other in parallel with each other, and they may be located at any position as long as they are not directly in contact with each other.

Similarly to the coil 11 and the coil 12, the wire 51 is constituted by a thin wire including any one of a metal, a dielectric material, a magnetic material, a semiconductor, and a superconductor, or a material selected from a plurality of combinations of these materials. Further, the material of the wire 51 is not necessarily the same as the materials of the coil 11 and the coil 12, and the materials of the wire 51, the coil 11, and the coil 12 may be different from each other. Furthermore, it is not limited to use only one wire 51, and two or more wires 51 may be used. Note that the wire 51 is not limited to being included in the coil 11 and the coil 12, and may be adjacent to or near the coil 11 and the coil 12.

In the wave control medium 50, it is assumed that the electric field direction of a radio wave to be applied coincides with the electron oscillation direction in which the wire 51 extends, and the magnetic field direction of the radio wave to be applied is orthogonal to the direction of magnetic force electromagnetically induced by a loop of electric current flowing through the coil 11 and the coil 12. In this case, the wire 51 functions for the magnetic field, and the coil 11 and the coil 12 function for the electric field. That is, the electrons oscillating along the wire 51 function for the magnetic field. In addition, the coil 11 and the coil 12 function for the electric field.

Functioning for the magnetic field as described above means controlling the relative magnetic permeability $\mu_r$, and functioning for the electric field as described above means controlling the relative permittivity $\varepsilon_r$. Therefore, the wave control medium 50 can more freely control the relative magnetic permeability and the relative permittivity to desired values by combining a plurality of structures.

The wave control medium 50 according to the present embodiment can provide an effect similar to the effect of the wave control medium 10 according to the first embodiment, and further, can finely adjust the relative magnetic permeability and/or the relative permittivity by distributing functions using the structure of the wire 51 in combination, in a case where it is difficult to obtain desired physical properties only by the spiral structures of the coil 11 and the coil 12. Furthermore, the wave control medium 50 also serves as a capacitor between the wire 51 and the coil 11, thereby being capable of increasing the capacitance as compared with the wave control medium 10.

(3) First Modification of Wave Control Medium 50

Figure 9:
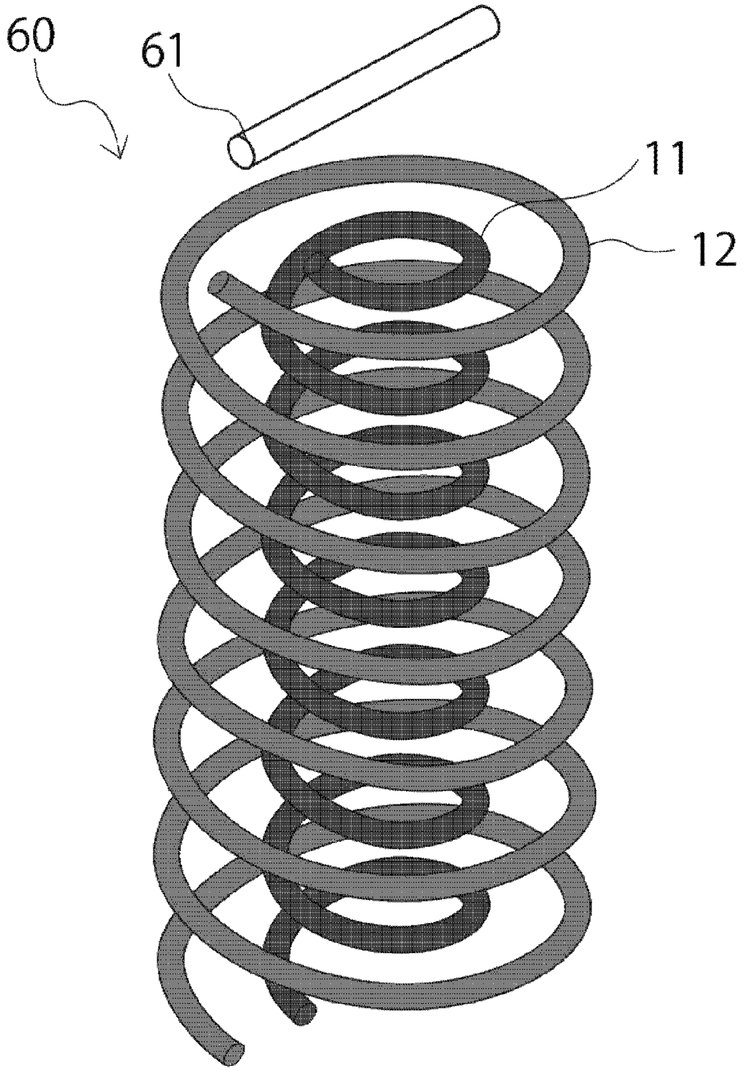
FIG. 9 is a perspective view illustrating a configuration example of a wave control medium according to a modification of the fifth embodiment of the present technology.

Next, the first modification of the wave control medium 50 will be described with reference to FIG. 9. FIG. 9 is a perspective view illustrating a configuration example of a wave control medium 60 according to the first modification of the wave control medium 50. The wave control medium 60 is different from the wave control medium 50 in that the wire is located outside the coil and extends in a direction orthogonal to the central axis of the coil. The other configurations of the wave control medium 60 are similar to those of the wave control medium 50.

As illustrated in FIG. 9, the wave control medium 60 includes a rod-shaped thin wire 61 extending in a direction orthogonal to the central axis of the spiral structure of the coil 11 and the coil 12 outside the coil 11 and the coil 12. The wire 61 is disposed apart from the coil 12 at a fine interval.

In the wave control medium 60, it is assumed that the electric field direction of a radio wave to be applied coincides with the electron oscillation direction in which the wire 61 extends, and the magnetic field direction of the radio wave to be applied coincides with the direction of magnetic force electromagnetically induced by a loop of electric current flowing through the coil 11 and the coil 12. In this case, the wire 61 functions for the electric field, and the coil 11 and the coil 12 function for the magnetic field. That is, the electrons oscillating along the wire 61 function for the electric field. In addition, when a loop of electric current is generated by oscillation of electrons along the coil 11 and the coil 12, a magnetic force is induced at a central axis position in the center of the coil 11 and the coil 12 by the principle of electromagnetic induction, and as a result, the coil 11 and the coil 12 function for the magnetic field.

Functioning for the electric field as described above means controlling the relative permittivity $\varepsilon_r$, and functioning for the magnetic field as described above means controlling the relative magnetic permeability $\mu_r$. Therefore, the wave control medium 60 can more freely control the relative permittivity and the relative magnetic permeability to desired values by combining a plurality of structures.

As in the wave control medium 50, the wave control medium 60 according to the present modification can finely adjust the relative permittivity and/or the relative magnetic permeability by distributing functions using the structure of the wire 61 in combination, in a case where it is difficult to obtain desired physical properties only by the spiral structures of the coil 11 and the coil 12.

(4) Second Modification of Wave Control Medium 50

Figure 10:
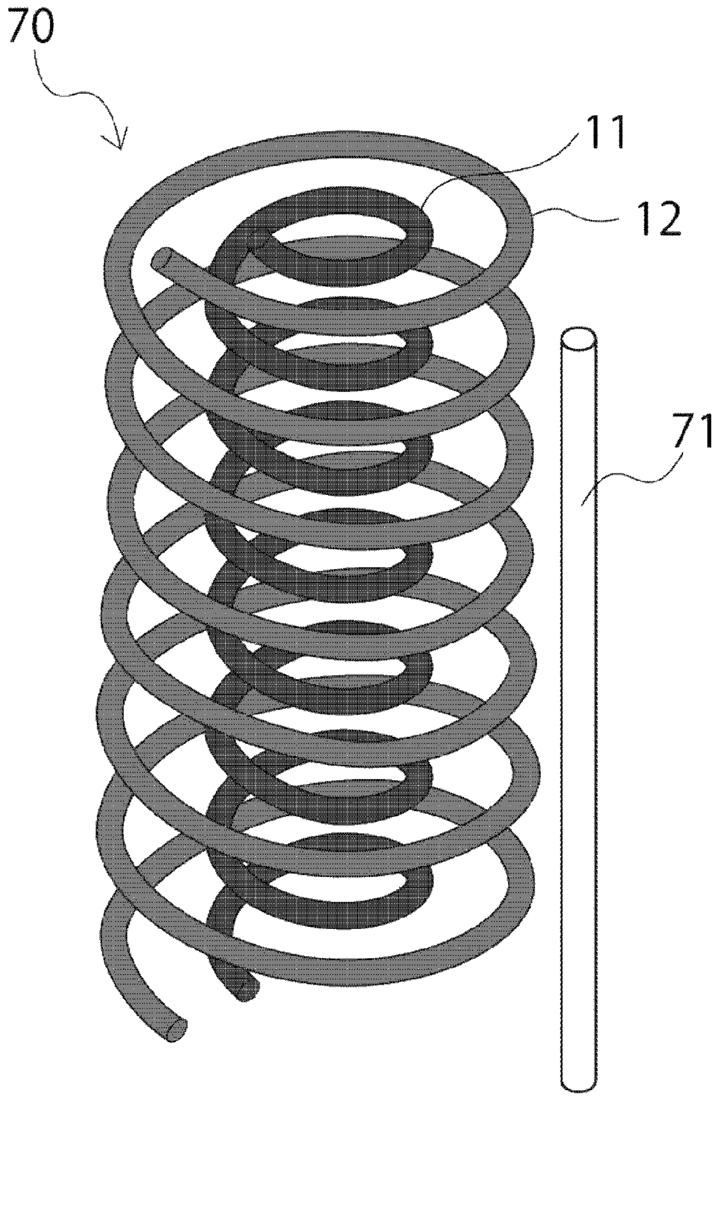
FIG. 10 is a perspective view illustrating a configuration example of a wave control medium according to another modification of the fifth embodiment of the present technology.

Next, the second modification of the wave control medium 50 will be described with reference to FIG. 10. FIG. 10 is a perspective view illustrating a configuration example of a wave control medium 70 according to the second modification of the wave control medium 50. The wave control medium 70 is different from the wave control medium 50 in that the wire is located outside the coil. The other configurations of the wave control medium 70 are similar to those of the wave control medium 50.

As illustrated in FIG. 10, the wave control medium 70 includes a rod-shaped thin wire 71 extending in a direction parallel to the central axis of the spiral structure of the coil 11 and the coil 12 outside the coil 11 and the coil 12. The wire 71 is disposed apart from the coil 12 at a fine interval.

In the wave control medium 70, it is assumed that the electric field direction of a radio wave to be applied coincides with the electron oscillation direction in which the wire 71 extends, and the magnetic field direction of the radio wave to be applied is orthogonal to the direction of magnetic force electromagnetically induced by a loop of electric current flowing through the coil 11 and the coil 12. In this case, the wire 71 functions for the magnetic field, and the coil 11 and the coil 12 function for the electric field. That is, the electrons oscillating along the wire 71 function for the magnetic field. In addition, the coil 11 and the coil 12 function for the electric field.

The wave control medium 70 according to the present modification can provide an effect similar to the effect of the wave control medium 50.

6. Sixth Embodiment (Combination with Plate Structure)

(1) Configuration Example of Wave Control Medium 80

Figure 11:
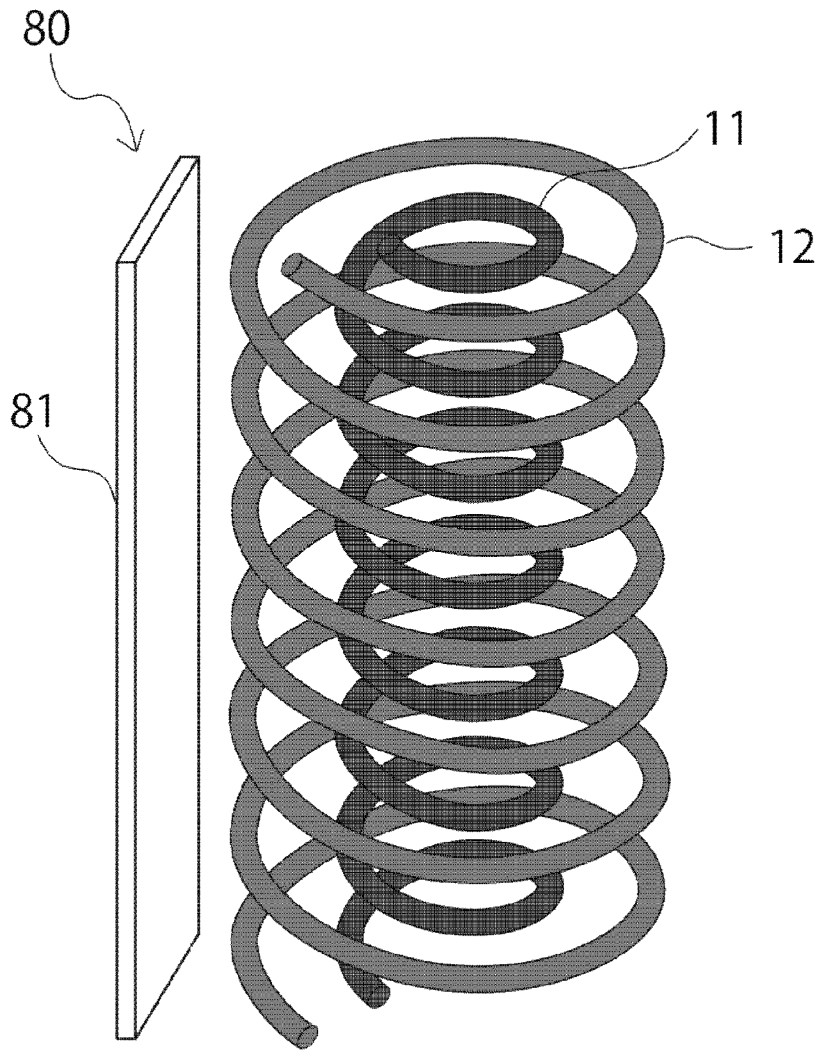
FIG. 11 is a perspective view illustrating a configuration example of a wave control medium according to a sixth embodiment of the present technology.

Next, a configuration example of a wave control medium 80 according to the sixth embodiment of the present technology will be described with reference to FIG. 11. FIG. 11 is a perspective view illustrating the configuration example of the wave control medium 80 according to the present embodiment. The wave control medium 80 is different from the wave control medium 10 according to the first embodiment in that a plate structure is combined with a double coil structure. The other configurations of the wave control medium 80 are similar to those of the wave control medium 10.

Similarly to the wave control medium 10, the wave control medium 80 includes a coil 11 and a coil 12 as illustrated in FIG. 11. In addition, the wave control medium 80 includes a thin sheet-shaped plate 81 extending in a direction parallel to the central axis of the spiral structure of the coil 11 and the coil 12 outside the coil 11 and the coil 12. The plate 81 is disposed apart from the coil 12 at a fine interval.

Similarly to the coil 11 and the coil 12, the plate 81 is constituted by a thin wire including any one of a metal, a dielectric material, a magnetic material, a semiconductor, and a superconductor, or a material selected from a plurality of combinations of these materials. Further, the material of the plate 81 is not necessarily the same as the materials of the coil 11 and the coil 12, and the materials of the plate 81, the coil 11, and the coil 12 may be different from each other. Furthermore, it is not limited to use only one plate 81, and two or more plates 81 may be used. Note that the plate 81 can also be provided at a central axis position of the spiral structure inside the coil 11 so as to be separated from the coil 11 in a direction in which the central axis extends. In this case, the wave control medium 80 serves as a capacitor between the plate 81 and the coil 11, thereby being capable of increasing the capacitance as compared with the wave control medium 10.

In the wave control medium 80, it is assumed that the electric field direction of a radio wave to be applied coincides with the electron oscillation direction in which the plate 81 extends, and the magnetic field direction of the radio wave to be applied is orthogonal to the direction of magnetic force electromagnetically induced by a loop of electric current flowing through the coil 11 and the coil 12. In this case, the plate 81 functions for the magnetic field, and the coil 11 and the coil 12 function for the electric field. That is, the electrons oscillating along the plate 81 function for the magnetic field. In addition, the coil 11 and the coil 12 function for the electric field.

Functioning for the magnetic field as described above means controlling the relative magnetic permeability $\mu_r$, and functioning for the electric field as described above means controlling the relative permittivity $\varepsilon_r$. Therefore, the wave control medium 80 can more freely control the relative magnetic permeability and the relative permittivity to desired values by combining a plurality of structures.

The wave control medium 80 according to the present embodiment can provide an effect similar to the effect of the wave control medium 10 according to the first embodiment, and further, can finely adjust the relative magnetic permeability and/or the relative permittivity by distributing functions using the structure of the plate 81 in combination, in a case where it is difficult to obtain desired physical properties only by the spiral structures of the coil 11 and the coil 12.

(2) Modification of Wave Control Medium 80

Figure 12:
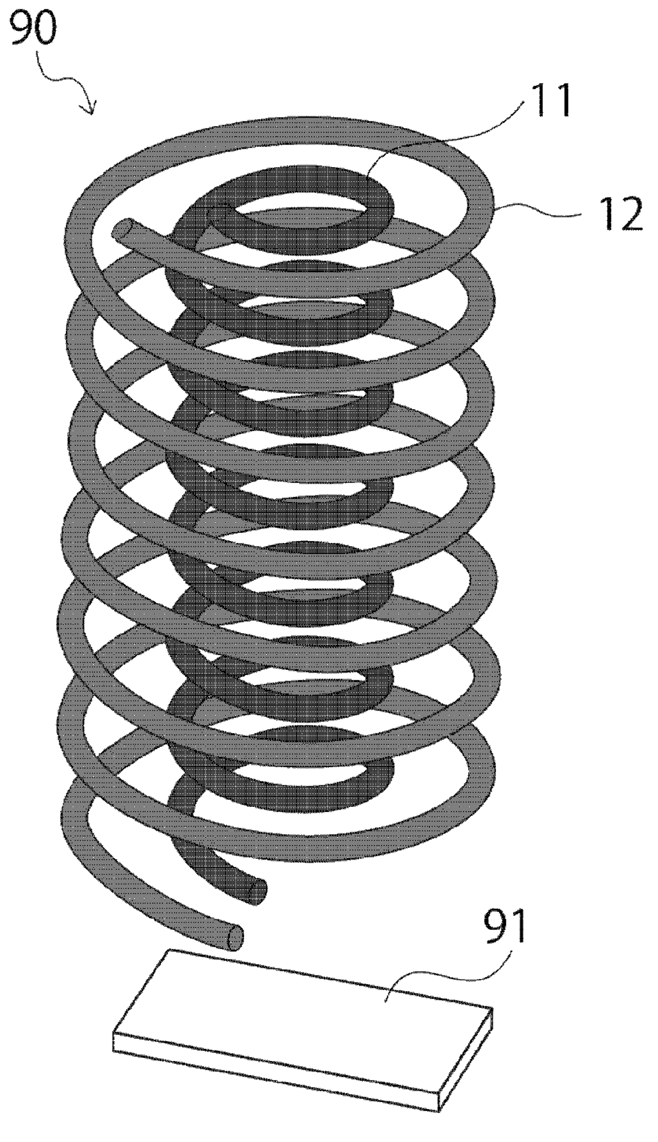
FIG. 12 is a perspective view illustrating a configuration example of a wave control medium according to a modification of the sixth embodiment of the present technology.

Next, a modification of the wave control medium 80 will be described with reference to FIG. 12. FIG. 12 is a perspective view illustrating a configuration example of a wave control medium 90 according to the modification of the wave control medium 80. The wave control medium 90 is different from the wave control medium 80 in that a plate extends in a direction orthogonal to the central axis of the coil. The other configurations of the wave control medium 90 are similar to those of the wave control medium 90.

As illustrated in FIG. 12, the wave control medium 90 includes a sheet-shaped thin wire plate 91 extending in a direction orthogonal to the central axis of the spiral structure of the coil 11 and the coil 12 outside the coil 11 and the coil 12. The plate 91 is disposed apart from the coil 12 at a fine interval.

In the wave control medium 90, it is assumed that the electric field direction of a radio wave to be applied coincides with the electron oscillation direction in which the plate 91 extends, and the magnetic field direction of the radio wave to be applied coincides with the direction of magnetic force electromagnetically induced by a loop of electric current flowing through the coil 11 and the coil 12. In this case, the plate 91 functions for the electric field, and the coil 11 and the coil 12 function for the magnetic field. That is, the electrons oscillating along the plate 91 function for the electric field. In addition, when a loop of electric current is generated by oscillation of electrons along the coil 11 and the coil 12, a magnetic force is induced at a central axis position in the center of the coil 11 and the coil 12 by the principle of electromagnetic induction, and as a result, the coil 11 and the coil 12 function for the magnetic field.

Functioning for the electric field as described above means controlling the relative permittivity $\varepsilon_r$, and functioning for the magnetic field as described above means controlling the relative magnetic permeability $\mu_r$. Therefore, the wave control medium 90 can more freely control the relative permittivity and the relative magnetic permeability to desired values by combining a plurality of structures.

As in the wave control medium 80, the wave control medium 90 according to the present modification can finely adjust the relative permittivity and/or the relative magnetic permeability by distributing functions using the structure of the plate 81 in combination, in a case where it is difficult to obtain desired physical properties only by the spiral structures of the coil 11 and the coil 12.

7. Seventh Embodiment (Combination with Spherical Structure)

Figure 13:
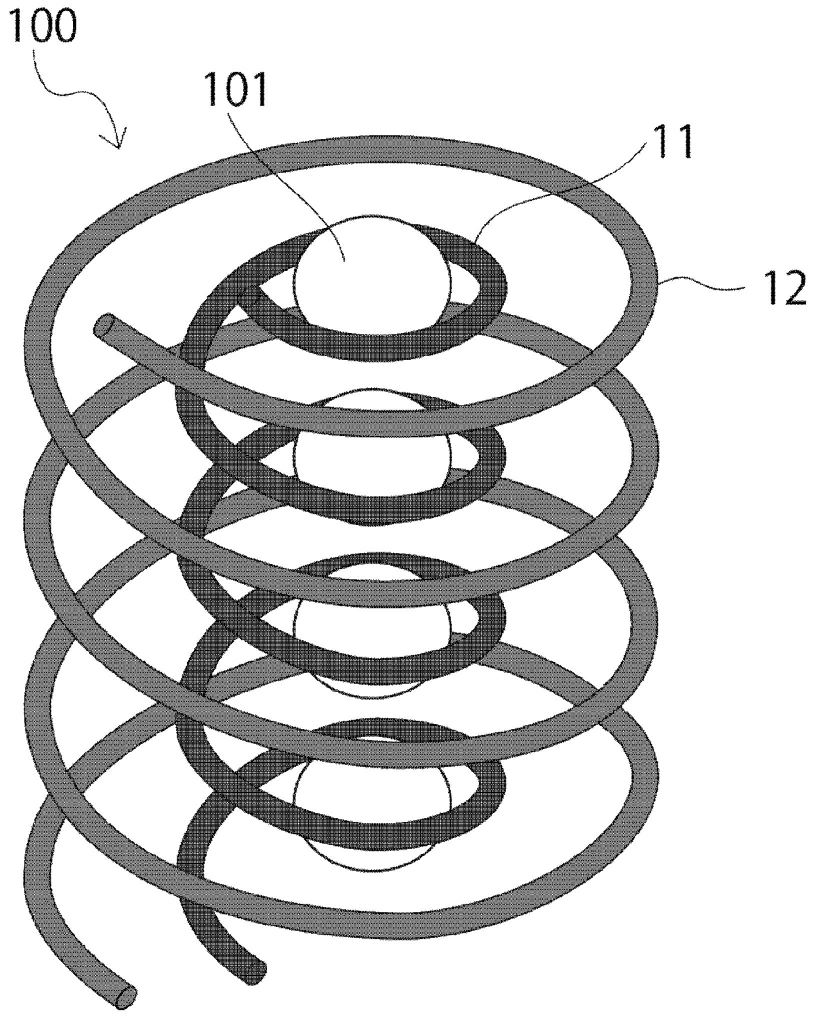
FIG. 13 is a perspective view illustrating a configuration example of a wave control medium according to a seventh embodiment of the present technology.

Next, a configuration example of a wave control medium 100 according to the seventh embodiment of the present technology will be described with reference to FIG. 13. FIG. 13 is a perspective view illustrating the configuration example of the wave control medium 100 according to the present embodiment. The wave control medium 100 is different from the wave control medium 10 according to the first embodiment in that a spherical structure is combined with a double coil structure. The other configurations of the wave control medium 100 are similar to those of the wave control medium 10.

As illustrated in FIG. 13, the wave control medium 100 includes a coil 11 and a coil 12 each of which is a three-dimensional microstructure, as in the wave control medium 10. Further, the wave control medium 100 is provided with a plurality of spheres 101 arrayed in the direction in which the central axis extends at the central axis position of the spiral structure inside the coil 11. Each of the spheres 101 is disposed apart from the coil 11 at a fine interval.

Similarly to the coil 11 and the coil 12, each of the spheres 101 is constituted by any one of a metal, a dielectric material, a magnetic material, a semiconductor, and a superconductor, or a material selected from a plurality of combinations of these materials. Further, the material of the sphere 101 is not necessarily the same as the materials of the coil 11 and the coil 12, and the materials of the sphere 101, the coil 11, and the coil 12 may be different from each other. Furthermore, the number of the spheres 101 is not limited, and any number of spheres 101 may be provided. Note that the spheres 101 can also be disposed outside the coil 11 and the coil 12.

In the wave control medium 100, it is assumed that the electric field direction of a radio wave to be applied coincides with the electron oscillation direction in which the spheres 101 are arrayed, and the magnetic field direction of the radio wave to be applied is orthogonal to the direction of magnetic force electromagnetically induced by a loop of electric current flowing through the coil 11 and the coil 12. In this case, the spheres 101 function for the magnetic field, and the coil 11 and the coil 12 function for the electric field. That is, the electrons oscillating along the spheres 101 function for the magnetic field. In addition, the coil 11 and the coil 12 function for the electric field.

The wave control medium 100 according to the present embodiment can provide an effect similar to the effect of the wave control medium 10 according to the first embodiment, and further, can finely adjust the relative magnetic permeability and/or the relative permittivity by distributing functions using the structure of the spheres 101 in combination, in a case where it is difficult to obtain desired physical properties only by the spiral structures of the coil 11 and the coil 12. Furthermore, the wave control medium 100 also serves as a capacitor between the spheres 101 and the coil 11, thereby being capable of increasing the capacitance as compared with the wave control medium 10.

8. Eighth Embodiment (Electromagnetic Wave Absorbing Member)

Figure 14:
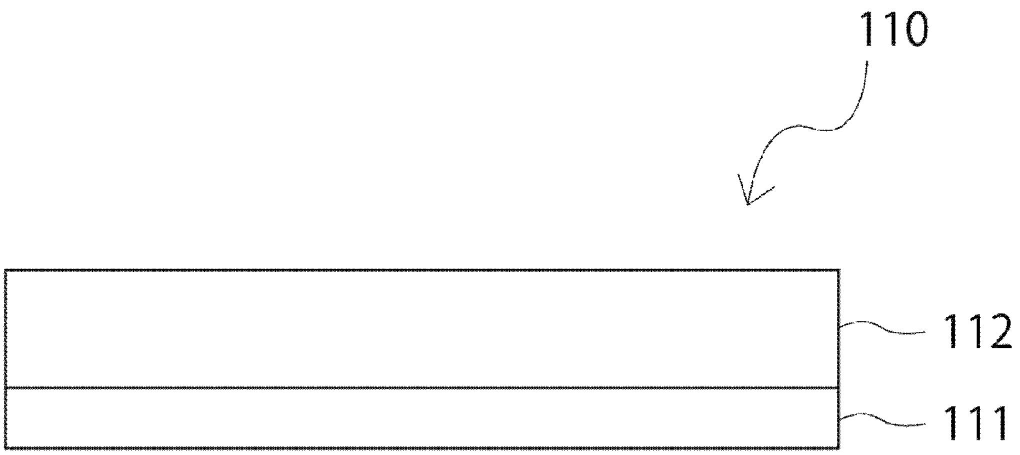
FIG. 14 is a cross-sectional view illustrating a configuration example of an electromagnetic wave absorbing member according to an eighth embodiment of the present technology.

Next, a configuration example of an electromagnetic wave absorbing member 110 according to the eighth embodiment of the present technology will be described with reference to FIGS. 14 and 15. FIG. 14 is a cross-sectional view illustrating a configuration example of the electromagnetic wave absorbing member 110 according to the present embodiment in a direction perpendicular to an extension direction.

As illustrated in FIG. 14, the electromagnetic wave absorbing member (electromagnetic wave absorbing sheet) 110 has a rectangular shape in which a cross section perpendicular to the extension direction is extended in the horizontal direction. The electromagnetic wave absorbing member 110 includes a support 111 in a lower portion and a wave control medium 112 on the support 111. The support 111 includes a metal, a dielectric material, or a resin.

The wave control medium 112 is a metamaterial having a resin of a wave control element in which any of the three-dimensional structures of the wave control mediums 10 to 100 described above is integrated in an array structure or a plurality of the three-dimensional structures are dispersed.

Figure 15:
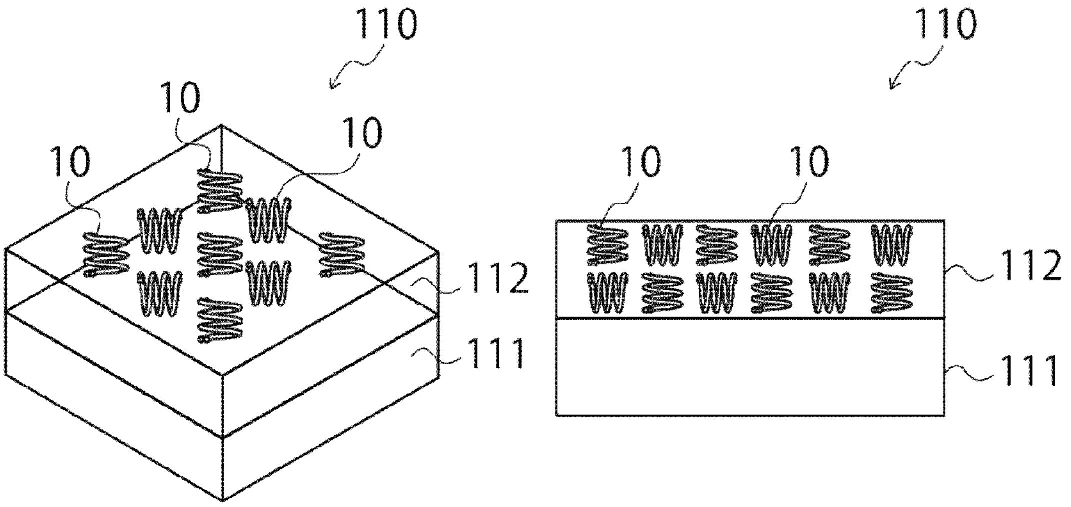
FIG. 15 is a perspective view illustrating the configuration example of the electromagnetic wave absorbing member according to the eighth embodiment of the present technology.

As an example, FIG. 15 illustrates a structure in which the three-dimensional structures of the wave control medium 10 are dispersed in a resin. FIG. 15A is a perspective view illustrating a configuration example of the electromagnetic wave absorbing member 110 viewed from an oblique direction. FIG. 15A is a perspective view illustrating a configuration example of the electromagnetic wave absorbing member 110 viewed in a cross-sectional direction.

In the electromagnetic wave absorbing member 110, the three-dimensional structures of the plurality of wave control mediums 10 are randomly dispersed in a resin of the wave control medium 112 as particles, as illustrated in FIGS. 15A and 15B.

The electromagnetic wave absorbing member 110 can absorb a radiated electromagnetic wave by controlling a refractive index in a direction of absorbing the electromagnetic wave by the wave control medium 112 in which the three-dimensional structures of the wave control medium 10 are arranged. The electromagnetic wave absorbing member 110 can also be used as an electromagnetic wave shielding member that shields a radiated electromagnetic wave by controlling a refractive index in a direction of shielding the electromagnetic wave by the wave control medium 112. Furthermore, the electromagnetic wave absorbing member 110 can be applied to a sensor of an ETC, a radar, or the like.

9. Ninth Embodiment (Electromagnetic Waveguide)

(1) Configuration Example of Electromagnetic Waveguide 120

Figure 16:
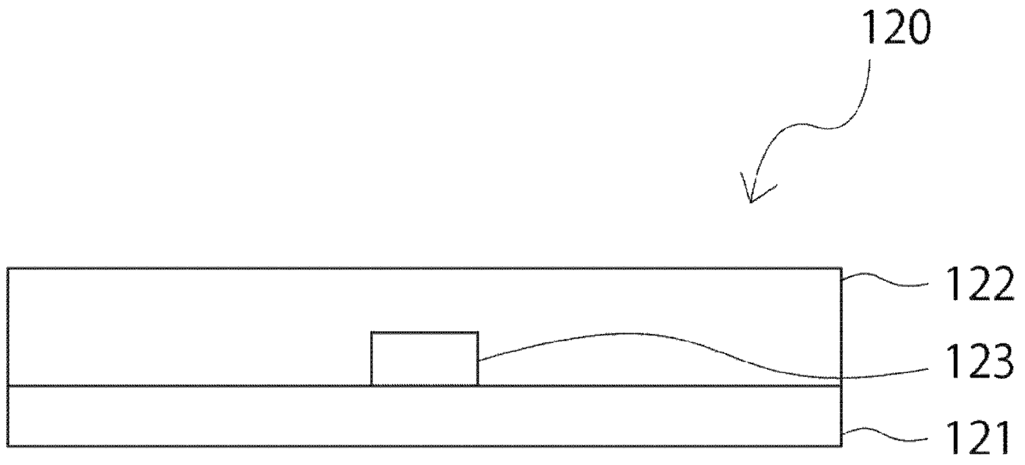
FIG. 16 is a cross-sectional view illustrating a configuration example of a waveguide according to a ninth embodiment of the present technology.

Next, a configuration example of the electromagnetic waveguide 120 according to the ninth embodiment of the present technology will be described with reference to FIG. 16. FIG. 16 is a cross-sectional view illustrating a configuration example of the electromagnetic waveguide 120 according to the present embodiment in a direction perpendicular to an extension direction.

As illustrated in FIG. 16, the electromagnetic waveguide 120 has a rectangular shape in which a cross section perpendicular to the extension direction is extended in the horizontal direction. The electromagnetic waveguide 120 includes a support 121 at a lower portion and includes a silicon dioxide ($SiO_2$) or dielectric medium 122 on the support 121. The support 121 includes silicon (Si), metal, a dielectric material, or a resin.

A waveguide 123 having a rectangular shape with a horizontally extended cross section is provided at a contact position with the support 121 in the central portion of the medium 122. The waveguide 123 is constituted by a metamaterial having a resin of a wave control element in which any of the wave control mediums 10 to 100 described above is integrated in an array structure or a plurality of the wave control mediums are dispersed. Note that the electromagnetic waveguide 120 and the waveguide 123 are not limited to have the shape in the present embodiment, and may have a cylindrical shape or the like.

With the above configuration, the electromagnetic waveguide 120 can control the refractive index of the electromagnetic wave guided to the waveguide 123. Furthermore, the electromagnetic waveguide 120 can be included in an arithmetic element.

(2) Modification of Electromagnetic Waveguide 120

Figure 17:
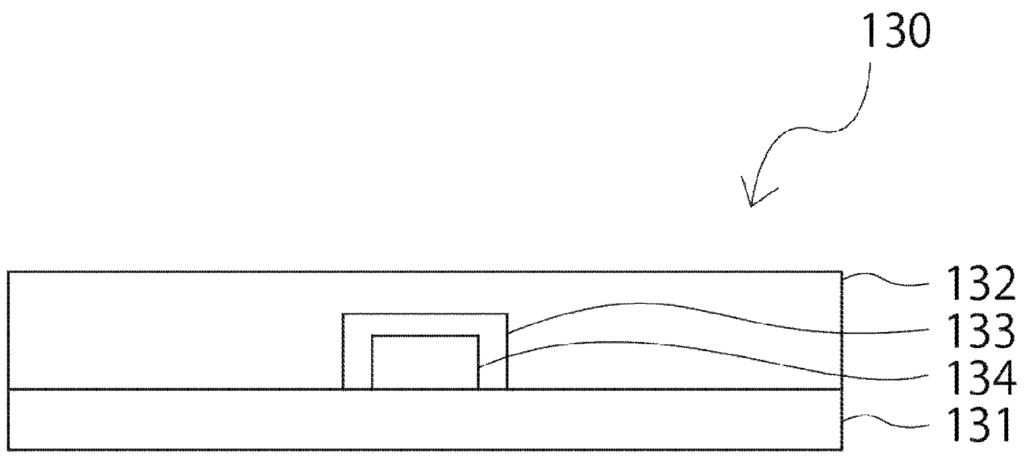
FIG. 17 is a sectional view illustrating a configuration example of a waveguide according to a modification of the ninth embodiment of the present technology.

Next, a configuration example of the electromagnetic waveguide 120 will be described with reference to FIG. 17. FIG. 17 is a cross-sectional view illustrating a configuration example of an electromagnetic waveguide 130 that is a modification of the electromagnetic waveguide 120 in a direction perpendicular to an extension direction. The electromagnetic waveguide 130 is different from the electromagnetic waveguide 120 in having a layer including a material other than the wave control medium within the waveguide. The overall shape of the electromagnetic waveguide 130 is similar to that of the electromagnetic waveguide 120.

As illustrated in FIG. 17, the electromagnetic waveguide 130 has a rectangular shape in which a cross section perpendicular to the extension direction is extended in the horizontal direction. The electromagnetic waveguide 130 includes a support 131 at a lower portion and includes a silicon dioxide ($SiO_2$) or dielectric medium 132 on the support 131. The support 131 includes a metal, a dielectric material, or a resin.

A waveguide 133 having a rectangular shape with a horizontally extended cross section is provided at a contact position with the support 131 in the central portion of the medium 132. The waveguide 133 is constituted by a metamaterial having a resin of a wave control element in which any of the wave control mediums 10 to 100 described above is integrated in an array structure or a plurality of the wave control mediums are dispersed. Furthermore, a medium layer 134 including silicon (Si) or resin and having the same shape as the waveguide 133 is formed at the contact position with the support 131 at the central portion of the waveguide 133.

With the above configuration, the electromagnetic waveguide 130 can control the refractive index of the electromagnetic wave guided to the waveguide 133.

10. Fractional Bandwidth

Figure 18:
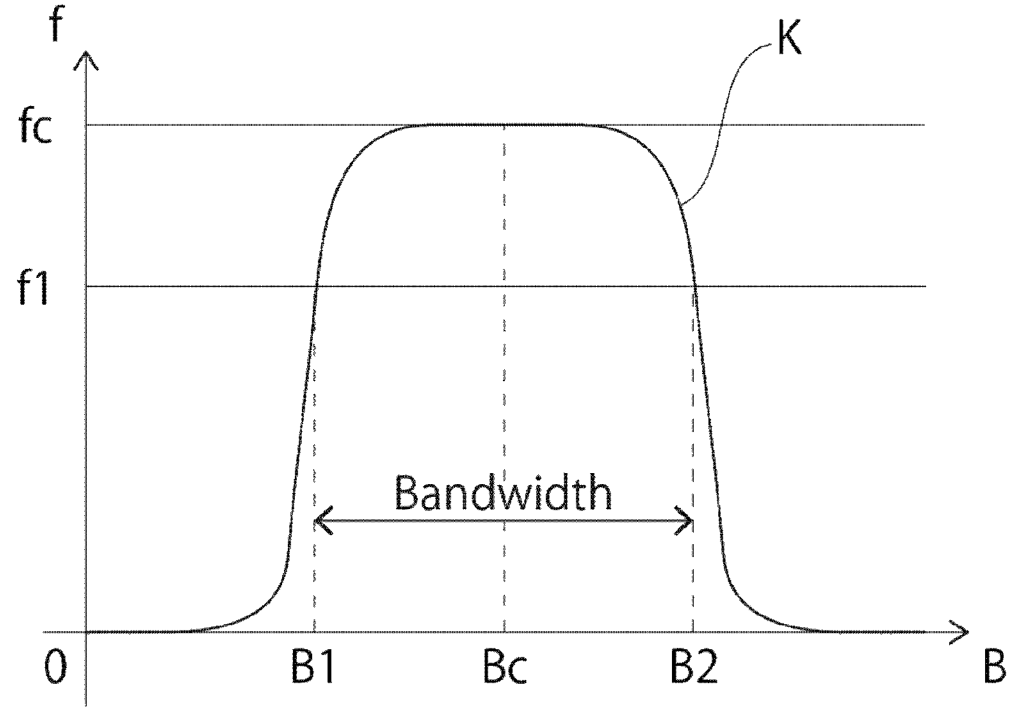
FIG. 18 is a graph illustrating a fractional bandwidth of a metamaterial having a wave control medium according to the present technology.

Next, a fractional bandwidth of a metamaterial having the wave control medium according to any of the embodiments of the present technology will be described with reference to FIG. 18. FIG. 18 is a graph illustrating an example of a fractional bandwidth of a metamaterial having the wave control medium according to any of the embodiments.

In the graph of FIG. 18, the vertical axis represents frequency f, and the horizontal axis represents frequency band B. A curve K in FIG. 18 indicates a relationship between the bandwidth B and the frequency f of the metamaterial having the wave control medium according to any of the above embodiments.

The fractional bandwidth of the metamaterial is obtained from the curve K. Here, the bandwidth refers to an inter-band distance of a frequency $2^{-1/2}$ of the peak frequency, and the fractional bandwidth refers to a value obtained by dividing the bandwidth by the peak frequency that is the center frequency.

In the curve K, the peak frequency fc is obtained at a band Bc, and a frequency $f_1$ which is $2^{-1/2}$ of the peak frequency is obtained at bands $B_1$ and $B_2$. Therefore, in the curve K, the bandwidth is $B_2-B_1$, and the fractional bandwidth is $(B_2-B_1)/fc$.

From the above, the wave control medium according to the above embodiments is optimal when the distance in the longitudinal direction of the wave control medium is less than 1/10 of the wavelength of a wave and the fractional bandwidth of a response is 30% or more. Therefore, the above embodiments can provide a wave control element including the wave control medium according to any of the above embodiments, in which the distance in the longitudinal direction is less than 1/10 of the wavelength of a wave, and the fractional bandwidth of a response is 30% or more. Note that, in the wave control element, the wave control medium may be integrated in an array structure, or a plurality of the wave control mediums may be dispersed.

11. Other Applications

Next, applications of the metamaterial having the wave control medium according to any of the above embodiments of the present technology will be described.

In addition to the above-described applications, the metamaterial having the wave control medium according to any of the above embodiments can be applied to a wave control device that performs transmission/reception or light emission/reception, a small antenna, a low-profile antenna, a frequency selection filter, an artificial magnetic conductor, an electric band gap member, an anti-noise member, an isolator, a radio wave lens, a radar member, an optical lens, an optical film, an optical element for terahertz, a radio wave and optical camouflage/invisualization member, a heat dissipation member, a heat shielding member, a heat storage member, a non-linear device for modulation/demodulation of an electromagnetic wave, wavelength conversion, etc., a speaker, and the like.

It is to be noted that the present technology may also have the following configurations.

(1)

A wave control medium comprising at least two three-dimensional microstructures in combination, each of the three-dimensional microstructures including any one of a metal, a dielectric material, a magnetic material, a semiconductor, and a superconductor, or a material selected from a plurality of combinations of a metal, a dielectric material, a magnetic material, a semiconductor, and a superconductor, the wave control medium having functions of a capacitor and an inductor.

(2)

The wave control medium according to (1), in which each of the three-dimensional microstructures is formed into a spiral structure.

(3)

The wave control medium according to (1) or (2), in which each of the three-dimensional microstructures is formed into a multilayer structure.

(4)

The wave control medium according to (1), in which the at least two three-dimensional microstructures are formed into a continuous structure in which the at least two three-dimensional microstructures are entangled with each other while facing each other without being in contact with each other.

(5)

The wave control medium according to any one of (1) to (3), in which each of the three-dimensional microstructures is formed into a conical shape.

(6)

The wave control medium according to any one of (1) to (5), in which at least one of the three-dimensional microstructures is formed into any one of a wire shape, a plate shape, and a spherical shape.

(7)

A wave control element comprising the wave control medium according to any one of (1) to (6), in which the wave control medium is integrated in an array structure.

(8)

A wave control element comprising a plurality of the wave control mediums according to any one of (1) to (6), in which the wave control mediums are dispersed.

(9)

A wave control element comprising the wave control medium according to any one of (1) to (6), in which a distance in a longitudinal direction is less than 1/10 of a wavelength of a wave, and a fractional bandwidth of a response is 30% or more.

(10)

A wave control device comprising a metamaterial including the wave control medium according to any one of (1) to (6).

(11)

A wave control device comprising an electromagnetic wave absorbing and/or shielding member having the metamaterial according to (10).

(12)

A wave control device comprising a sensor including the electromagnetic wave absorbing and/or shielding member according to (11).

(13)

A wave control device comprising an electromagnetic waveguide including the wave control medium according to any one of (1) to (6).

(14)

A wave control device comprising an arithmetic element including the electromagnetic waveguide according to (13).

(15)

A wave control device that performs transmission/reception or light reception/emission using the wave control medium according to any one of (1) to (6).

(16)

A method for manufacturing a wave control medium, the method comprising forming a microstructure into a three-dimensional structure using a molecular template that uses self-assembly of an organic substance, the microstructure including any one of a metal, a dielectric material, a magnetic material, a semiconductor, and a superconductor, or a material selected from a plurality of combinations of a metal, a dielectric material, a magnetic material, a semiconductor, and a superconductor.

REFERENCE SIGNS LIST

10, 15, 20, 30, 40, 50, 60, 70, 80, 90, 100 Wave control medium

11, 12, 16, 17, 21, 22, 31, 32, 41, 42 Coil (three-dimensional structure)

13, 18, 23 Matching element

14, 19, 24 Base section

51, 61, 71 Wire

81, 91 Plate

101 Sphere

110 Electromagnetic wave absorbing member

111, 121, 131 Support

112 Wave control medium

120, 130 Electromagnetic waveguide

122, 132 Medium

123, 133 Waveguide

134 Medium layer

The invention claimed is:

1. A wave control medium comprising at least two three-dimensional microstructures in combination, each of the three-dimensional microstructures including any one of a metal, a dielectric material, a magnetic material, a semiconductor, and a superconductor, or a material selected from a plurality of combinations of a metal, a dielectric material, a magnetic material, a semiconductor, and a superconductor, the wave control medium having functions of a capacitor and an inductor, wherein a distance of the wave control medium in a longitudinal direction is less than 1/10 of a wavelength of a wave, and a fractional bandwidth of a response is 30% or more.

2. The wave control medium according to claim 1, wherein each of the three-dimensional microstructures is formed into a spiral structure.

3. The wave control medium according to claim 1, wherein each of the three-dimensional microstructures is formed into a multilayer structure.

4. The wave control medium according to claim 1, wherein the at least two three-dimensional microstructures are formed into a continuous structure in which the at least two three-dimensional microstructures are entangled with each other while facing each other without being in contact with each other.

5. The wave control medium according to claim 1, wherein each of the three-dimensional microstructures is formed into a conical shape.

6. The wave control medium according to claim 1, wherein at least one of the three-dimensional microstructures is formed into any one of a wire shape, a plate shape, and a spherical shape.

7. A wave control element comprising the wave control medium according to claim 1, wherein the wave control medium is integrated in an array structure.

8. A wave control element comprising a plurality of the wave control mediums according to claim 1, wherein the wave control mediums are dispersed.

9. A wave control device comprising a metamaterial including the wave control medium according to claim 1.

10. A wave control device comprising an electromagnetic wave absorbing and/or shielding member having the metamaterial according to claim 9.

11. A wave control device comprising a sensor including the electromagnetic wave absorbing and/or shielding member according to claim 10.

12. A wave control device comprising an electromagnetic waveguide including the wave control medium according to claim 1.

13. A wave control device comprising an arithmetic element including the electromagnetic waveguide according to claim 12.

14. A wave control device that performs transmission/reception or light reception/emission using the wave control medium according to claim 1.

15. A method for manufacturing a wave control medium, the method comprising forming a microstructure into a three-dimensional structure using a molecular template that uses self-assembly of an organic substance, the microstructure including any one of a metal, a dielectric material, a magnetic material, a semiconductor, and a superconductor, or a material selected from a plurality of combinations of a metal, a dielectric material, a magnetic material, a semiconductor, and a superconductor, wherein the wave control medium having functions of a capacitor and an inductor, and wherein a distance of the wave control medium in a longitudinal direction is less than 1/10 of a wavelength of a wave, and a fractional bandwidth of a response is 30% or more.

* * * * *